United States Patent [19]
Ono et al.

[11] Patent Number: 5,100,223
[45] Date of Patent: Mar. 31, 1992

[54] ZOOM LENS

[75] Inventors: Shusuke Ono, Takatsuki; Keizo Ishiguro, Katano; Yasuo Nakajima, Ibaraki; Hisayuki Ii, Katano; Rieko Hiramoto, Moriguchi, all of Japan

[73] Assignee: Matsushita Electric Industrial Co., Ltd., Osaka, Japan

[21] Appl. No.: 541,735

[22] Filed: Jun. 21, 1990

[30] Foreign Application Priority Data

Jun. 26, 1989 [JP] Japan .................................. 1-163058
Jun. 29, 1989 [JP] Japan .................................. 1-169295

[51] Int. Cl.$^5$ ............................................. G02B 15/15
[52] U.S. Cl. ..................................... 359/683; 359/676
[58] Field of Search ................. 350/423, 427, 432, 469

[56] References Cited

U.S. PATENT DOCUMENTS

| | | | |
|---|---|---|---|
| 4,364,642 | 12/1982 | Yanaka et al. | 350/429 |
| 4,460,251 | 7/1984 | Okudira | 350/427 |
| 4,478,496 | 10/1984 | Kato | 350/423 |
| 4,653,872 | 3/1987 | Takahashi | 350/427 |
| 4,749,267 | 6/1988 | Mihara | 350/427 |
| 4,859,042 | 8/1989 | Tanaka | 350/423 |

Primary Examiner—Bruce Y. Arnold
Assistant Examiner—James Phan
Attorney, Agent, or Firm—Wenderoth, Lind & Ponack

[57] ABSTRACT

A zoom lens of this invention comprises in successive order from the object side a first group having a positive refractive power and fixed, a second group having a negative refracting power for effecting a variation of image magnification by moving on the optical axis, a third group having a positive power for effecting a light condensing action and fixed, and a fourth group moving on the optical axis so as to keep an image surface position to be changed in response to a move of the second group and a move of the object in a constant positional relation with the reference surface. Comparatively large air space is provided between the third and fourth groups of the zoom lens.

8 Claims, 11 Drawing Sheets

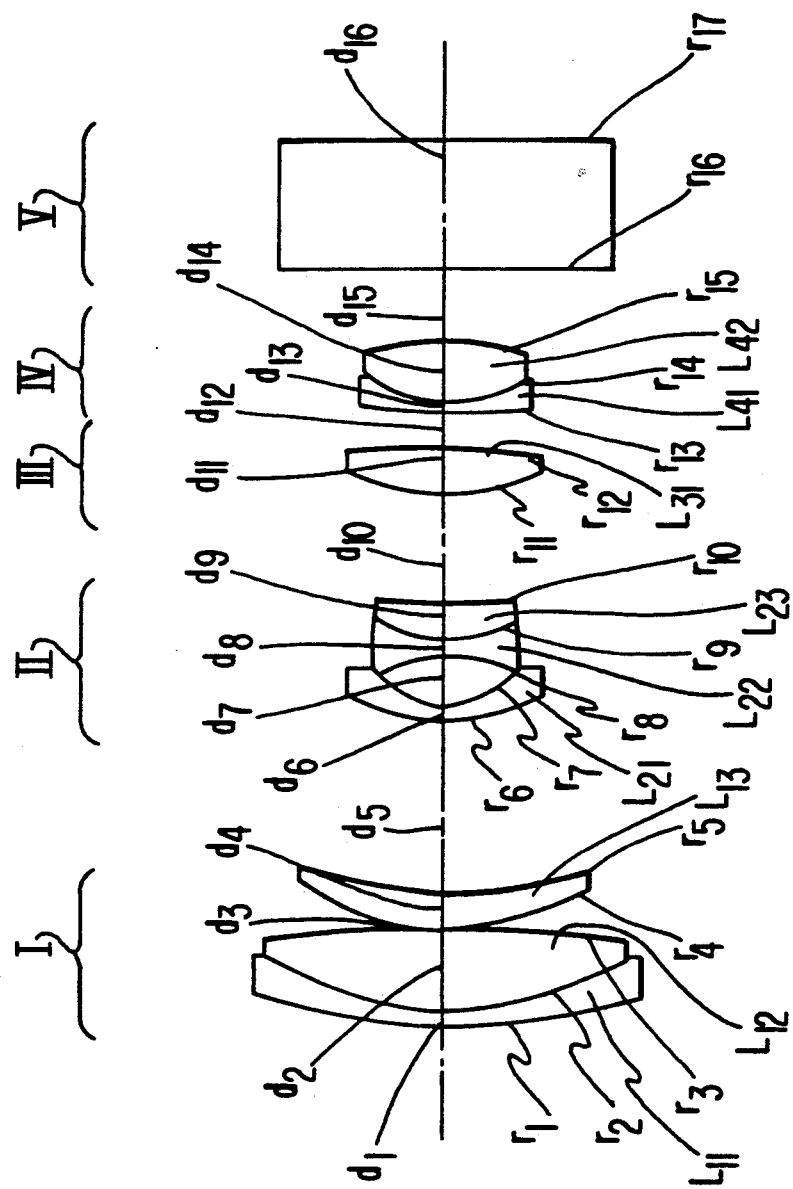

ZOOM LENS

BACKGROUND OF THE INVENTION

1. Field of the Invention

This invention relates to a zoom lens for use in a video camera, an electronic still camera or the like, which is compact in size and superior in performance with a zoom ratio of about six.

2. Description of the Prior Art

Recently, video cameras have required to effect a good operability and maneuverability as well as to produce a higher picture image quality Under such a trend, small-sized as ½ or ⅓-inch and high resolution image devices are becoming playing a leading role in responding to these requirements. And, accompanied with which, it has been strongly emphasized to use zoom lenses which are large in aperture ratio, small in size and light in weight as well as high in performance. In addition, cost reduction has also been largely required As a result, practical realization of zoom lenses which make possible the reduction in the number of lens components while performances are being maintained at a high level is of urgent necessity.

Conventional video camera zoom lenses with the F-number of about 1.4 and zoom ratio of about six were so-called four-group lens system using more than 13 lens elements.

A conventional four-group zoom lens is disclosed in, for example, U.S. Pat No. 4,749, 267, in which, looking from the object side, the first group having a positive refractive power moves on the optical axis to effect focusing. The second group having a negative refractive power moves on the optical axis to effect zooming. The third group having a negative refractive power moves on the optical axis while holding a constant relation with the second group thereby to keep the image surface position to be changed with the move of the second group in a constant positional relation with the reference surface. The fourth group having a positive refractive power moves the image surface to be formed through the first, second and third groups to the desired position and yet carries out necessary aberration corrections to effect the realization of height picture image quality. On the focusing, the first group is drawn out in the forward direction, so that such problems have been pointed out that lenses to be used for forming this group become large in diameter and large in weight, which means that the compactization is difficult to be realized. Also, on the focusing, the angle of view is varied, so that an image can be fluctuated in the focusing process, which has been pointed out as a problem that can decrease the dignity of focusing.

In order to solve the above-mentioned problems, a method in which other groups than the first group of a zoom lens are moved in the focusing process, so-called inner focusing method, has been conventionally employed.

For example, a method of focusing by moving the third group is disclosed in U.S. Pat. No. 4,364,642 and another method of focusing by moving the second and third groups is disclosed in U.S. Pat. No. 4,460,251. With the above-mentioned methods, however, the moving amount of the lens group or groups becomes large in the focusing process, thus arising such a problem that the entire length of lens system cannot be reduced.

In U.S. Pat. No. 4,859,042 is disclosed a method to provide the fourth group with a focusing function in order to solve these problems. In this case, however, the number of lenses of the third group becomes large (see Embodiments 1, 2, 3, 8 and 9). The third group is made of a lens group consisting of convex, concave and convex lenses arranged in this order from the object side, so that diameters of these lenses become large (see Embodiments 4, 5 and 6). In addition, as the third group has a convex spherical lens and concave spherical lens arranged in this order from the object side, the F-number becomes large to make it dark (see Embodiment 7) and zoom ratio is small (Embodiments 10, 11, and 12).

SUMMARY OF THE INVENTION

An object of this invention is to provide a zoom lens for use in video cameras, which is small in the number of lens elements to be used, large in aperture ratio, small in size and weight as well as high in performance.

In order to attain the above-mentioned object, a zoom lens of this invention comprises, in successive order from the object side, a first group having a positive refractive power for effecting an image-forming function, a second group having a negative refractive power for effecting a variation of the image magnification by moving on the optical axis, a third group having a positive refractive power for effecting a light condensing function, and a fourth group having a positive refractive power and moving on the optical axis so as to keep the image surface position to be changed with a move of the second group and a move of an object in a constant positional relation with a reference surface. The maximum air space between the third and fourth groups is larger than the moving amount of the fourth group. Each group is of a lens type and has a surface shape preferable from the viewpoint of aberration performance.

The third group is preferably made of two lenses having positive refractive powers and a lens having a negative refractive power in the order from the object side. Or, the third group is preferably made of a single aspherical lens having a positive refractive power.

With the above-mentioned configuration, problems conventionally remained to be overcome can be solved, so that a high performance, small size and light weight zoom lens for use in video cameras can be practically realized, which has a small number of lens components and exhibits a F-number of about 1.4 and zoom ratio of about six.

BRIEF DESCRIPTION OF THE DRAWINGS

FIGS. 1 and 4 schematically show sectional views of the first and third embodiments according to this invention.

DESCRIPTION OF THE PREFERRED EMBODIMENTS

Figure 1:
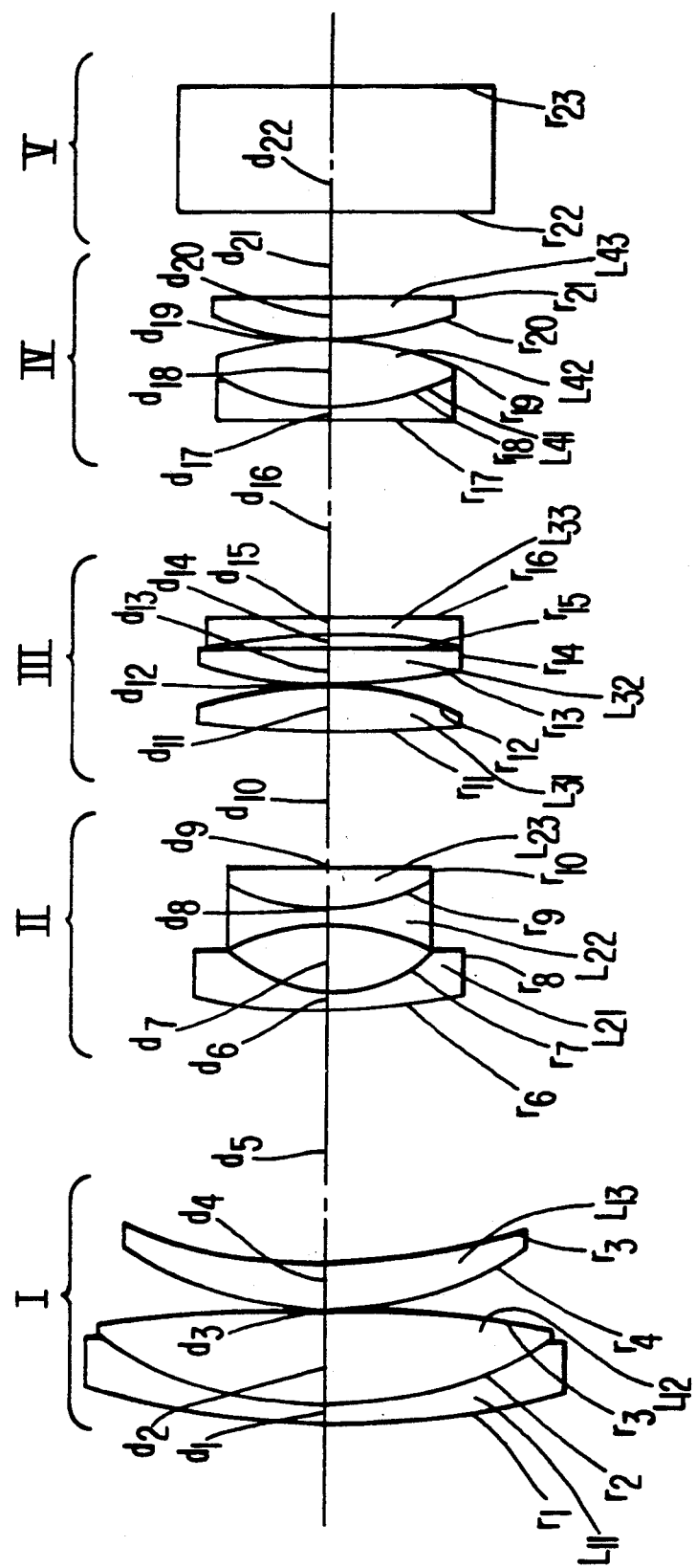
Figure 2A:
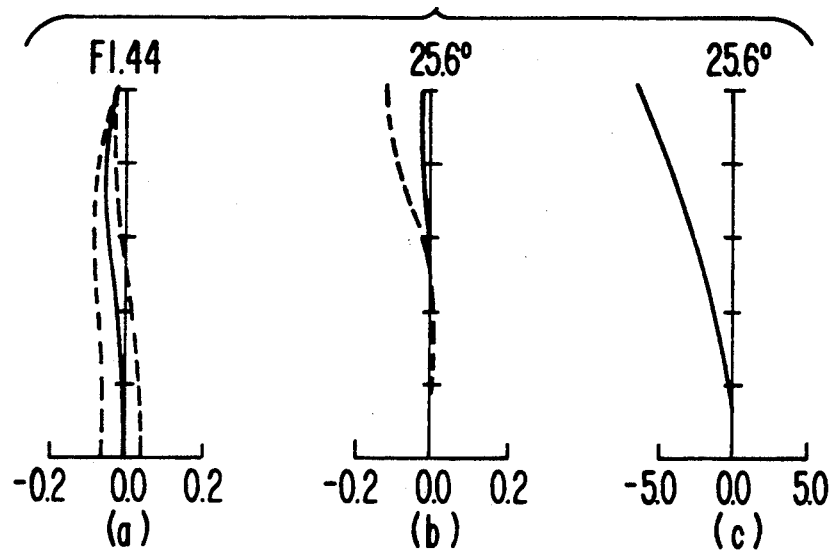
FIGS. 2A-3C and 5A-8C are aberration characteristic diagrams of the first embodiment through the sixth embodiment according to this invention, respectively.
Figure 2B:
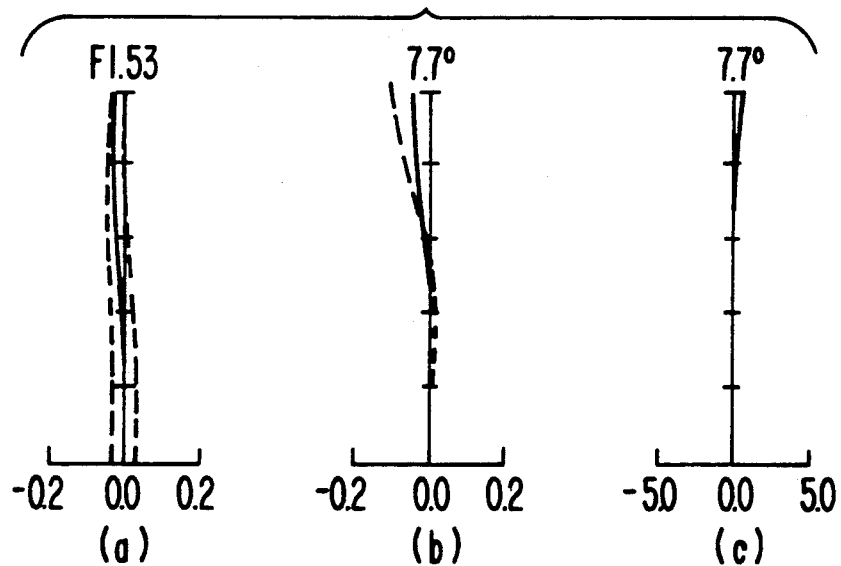
Figure 2C:
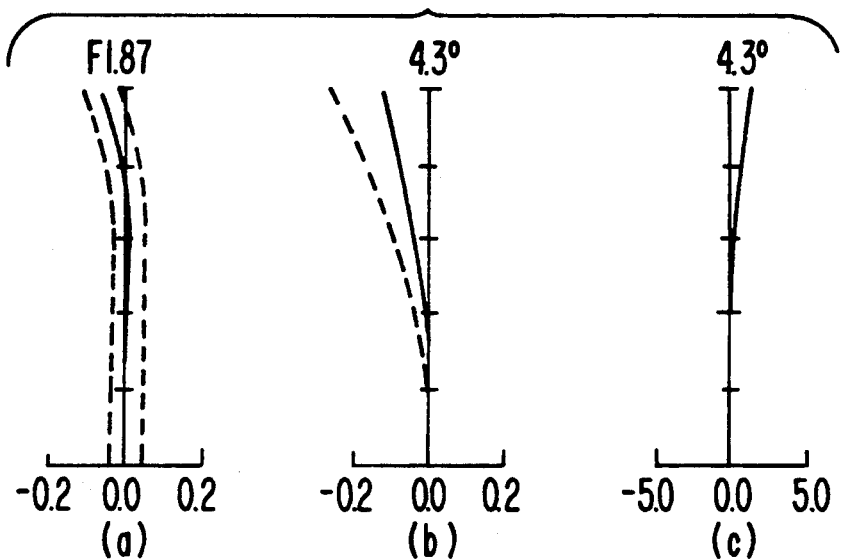
Figure 3A:
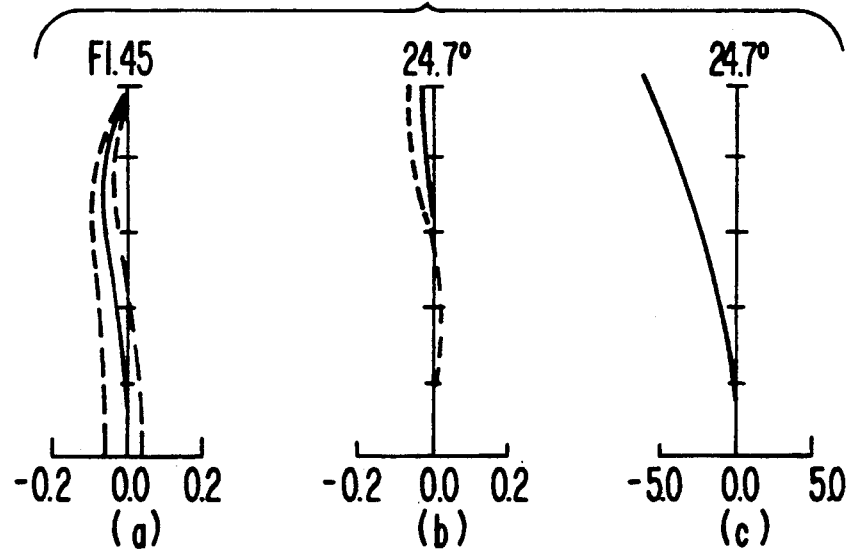
Figure 3:
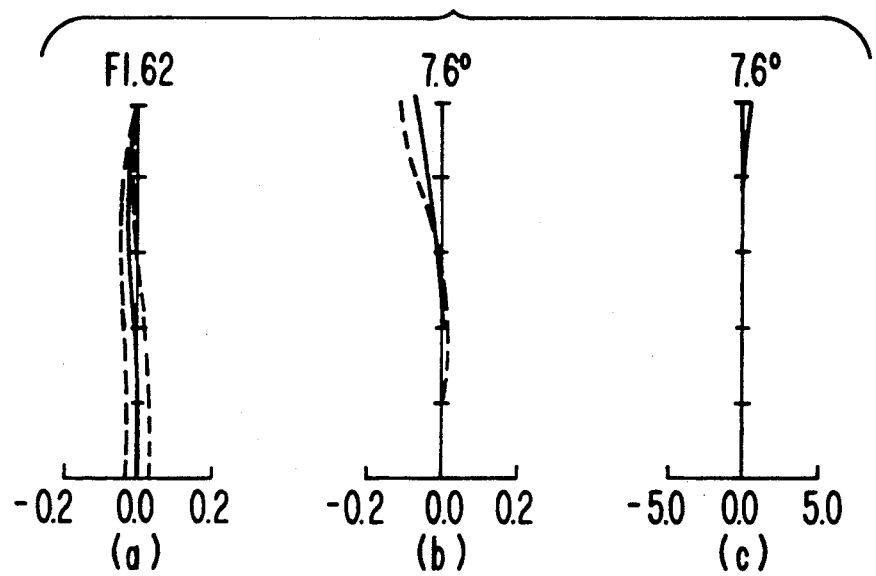
Figure 3:
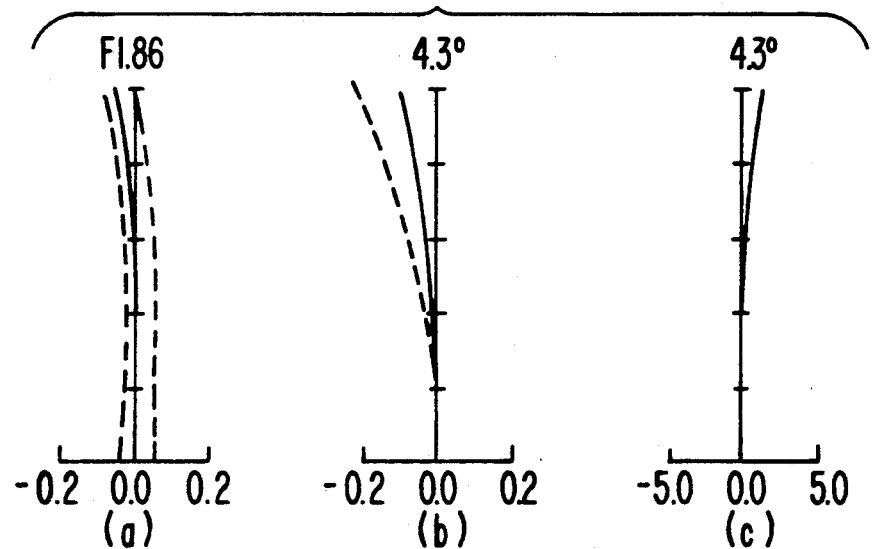
Figure 5A:
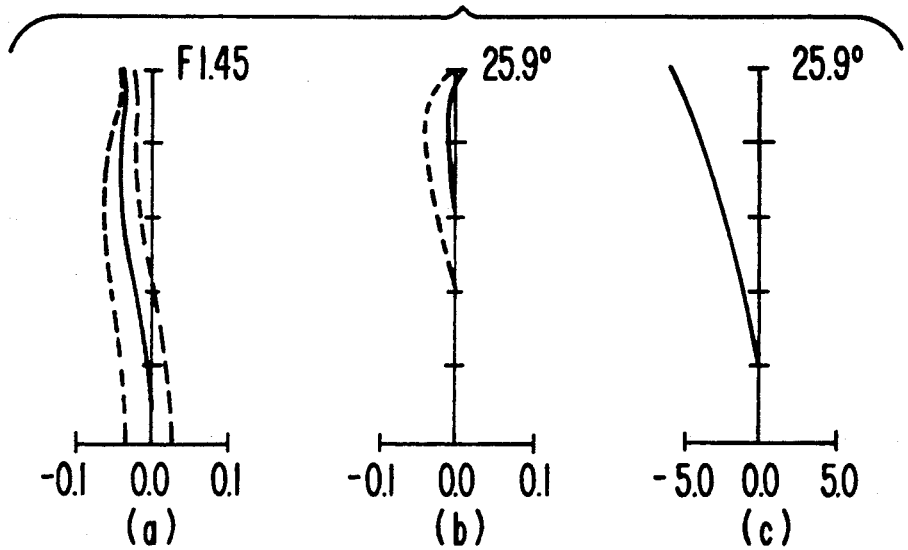
Figure 5B:
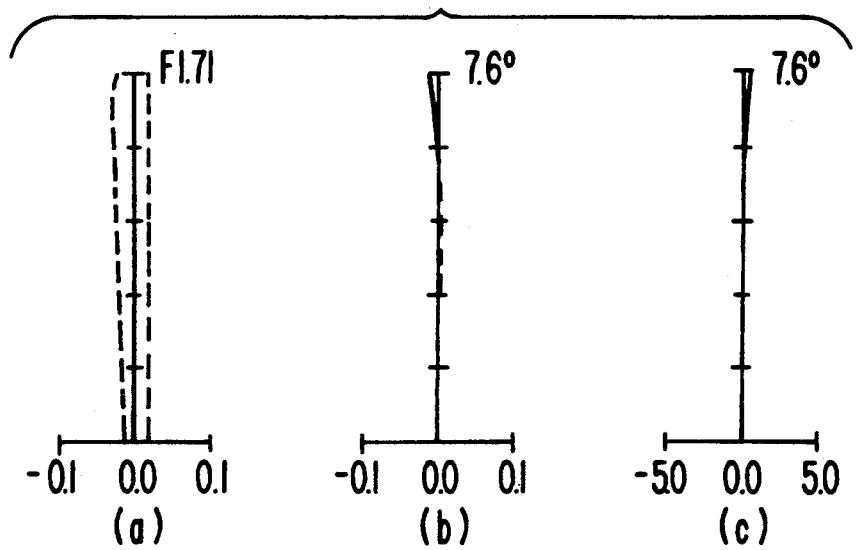
Figure 5:
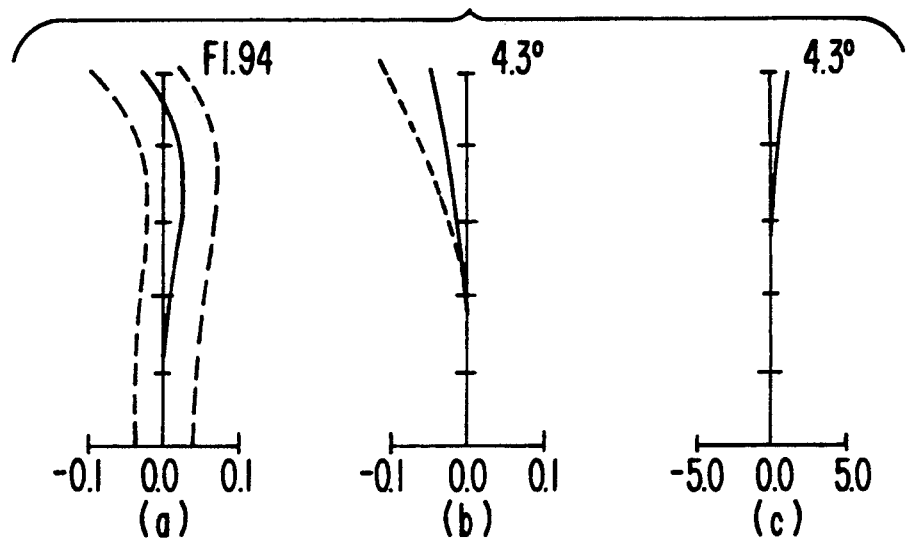
Figure 6:
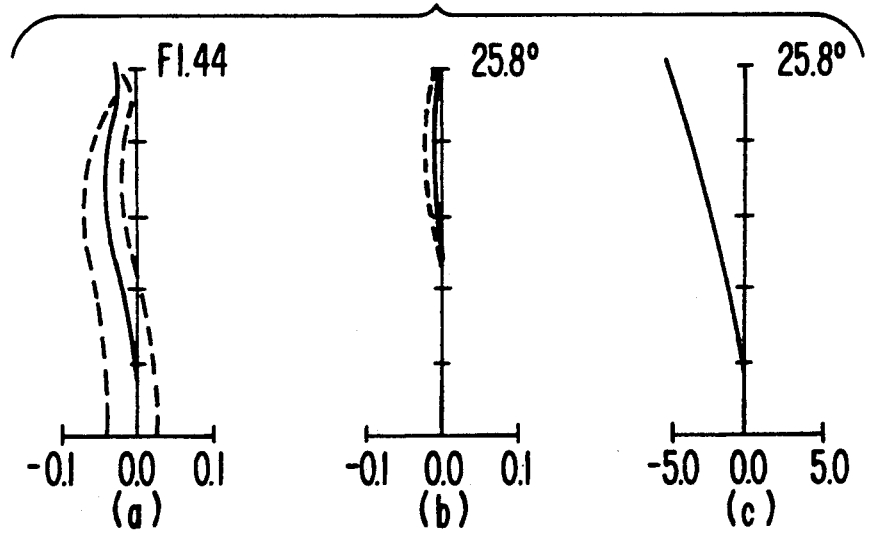
Figure 6:
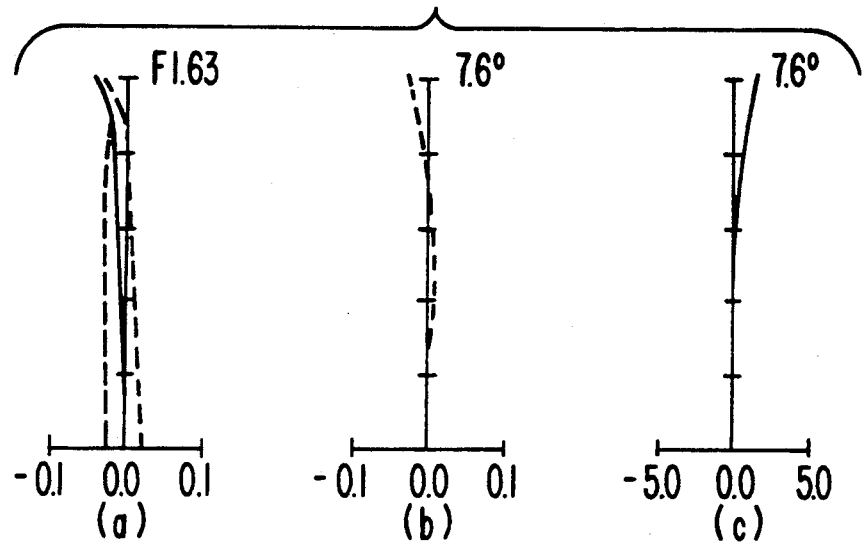
Figure 6:
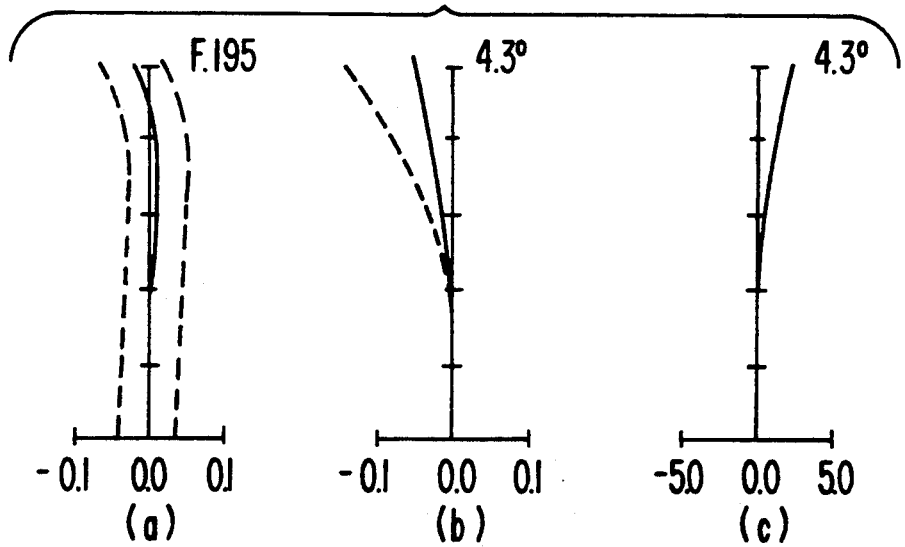
Figure 7A:
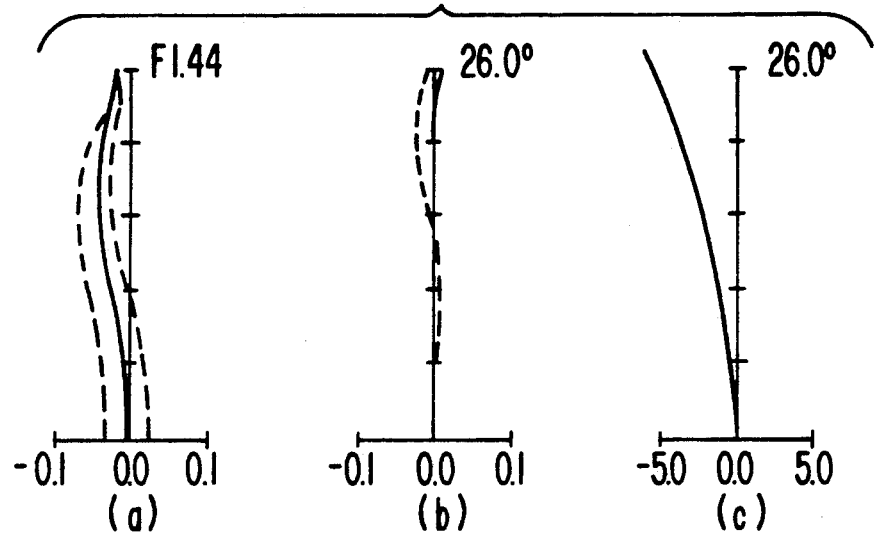
Figure 7B:
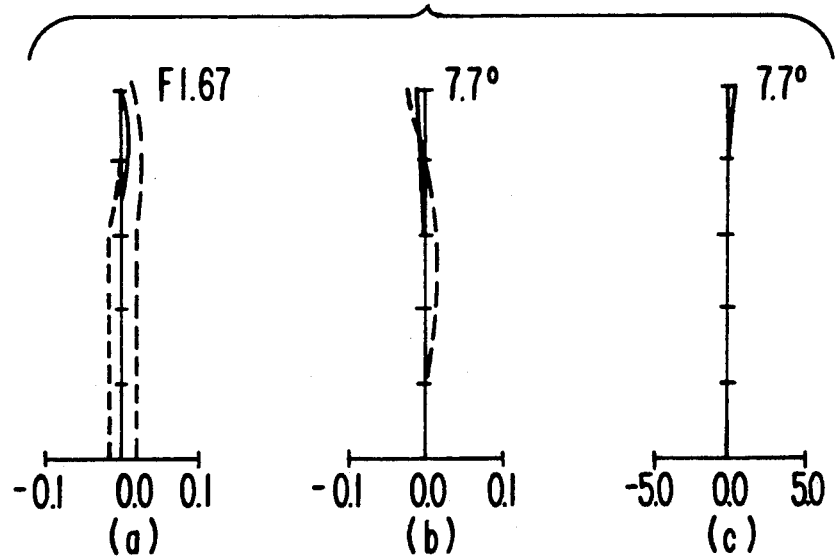
Figure 7C:
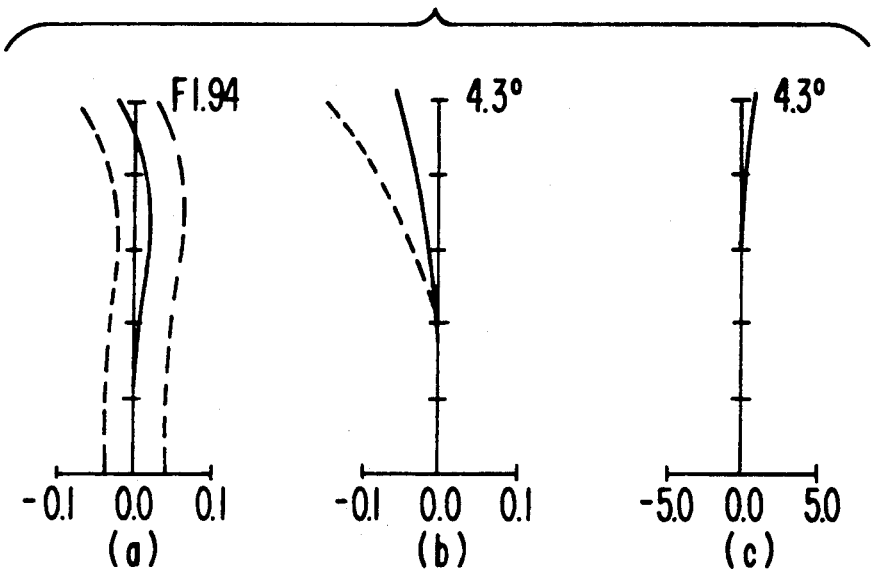
Figure 8A:
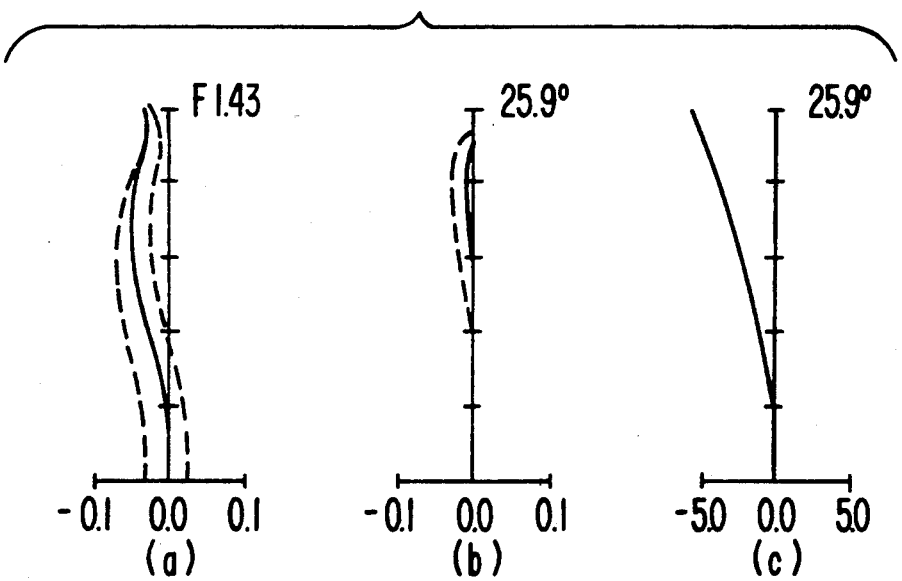
Figure 8B:
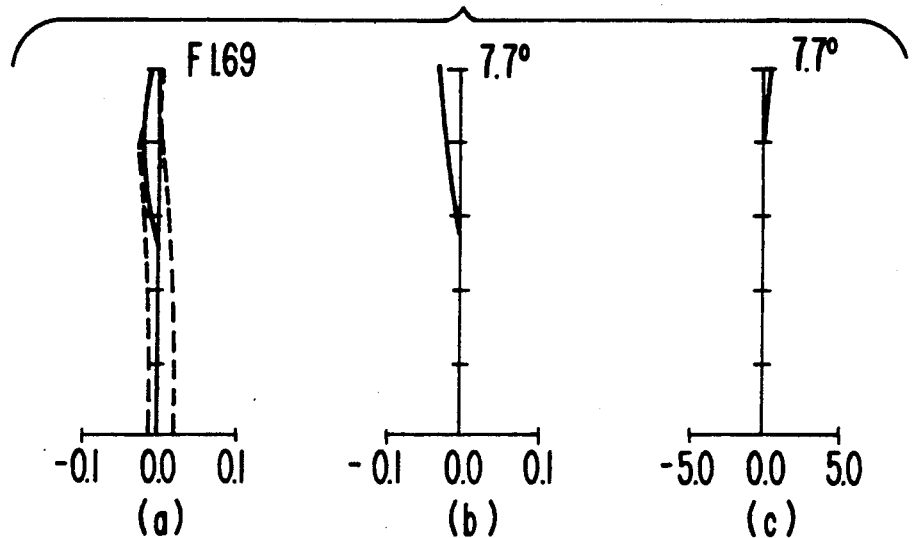
Figure 8C:
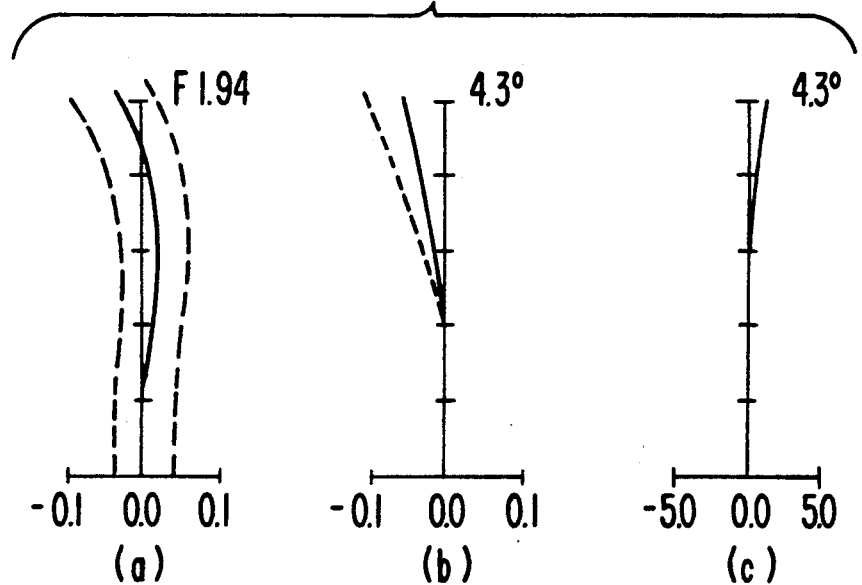

FIG. 1 schematically shows a sectional view of a first embodiment according to this invention.

In FIG. 1, the reference Roman numerals I, II, III, IV and V indicate a first group having a positive refractive power, a second group having a negative refractive power, a third group having a positive refractive power, a fourth group having a positive refractive power and an optically equivalent glass plate corresponding to a quartz-crystal filter and the face plate of an image device or the like, respectively.

The first group I and third group III are unmovable in effecting both the zooming and the focusing. Variable power in the zooming process can be realized mainly by the move of the second group II, and the change in image-forming position induced in this case is corrected by moving the fourth group IV in response to the position of the second group II. The focusing is carried out by moving the fourth group IV. As a result, both the focusing and zooming can be effected by moving only two groups out of the above-mentioned four groups forming the zoom lens system, so that the optical system can be made simple in structure and economical to manufacture. In addition, since the first group I is not drawn out in the forward direction in the focusing process, diameters of respective lenses forming the first group I can be reduced, leading to the compactization.

Further in addition, by selecting the refractive power of the first group to a positive, that of the second group to a negative and that of the third group to a positive, the change in the angle of view due to the move of the fourth group in the focusing process can be decreased up to a level that is practically negligible, which makes possible the realization of a high dignity focusing.

It is preferable, in this case, to set a space $d_{16}$ between the third group III and the four group IV so as to be larger than the moving amount of the fourth group IV to prevent the same from coming into collision with the third group III in effecting the zooming and focusing processes, thus being capable of realizing a smaller closest range for photographing. The total length of the lens system will be slightly large, but the lenses forming the fourth group IV can be respectively made small in diameter and light in weight, so that the entire optical system including a driving unit can be advantageously attained compactization.

The zoom lens of the first embodiment of this invention is preferable to be arranged such that looking from the object side, the first group I has a negative lens $L_{11}$, a positive lens $L_{12}$ and a positive meniscus lens $L_{13}$, the second group II has a negative meniscus lens $L_{21}$, a negative lens $L_{22}$ and a positive lens $L_{23}$, the third group III has two positive lenses $L_{31}$ and $L_{32}$ and a negative lens $L_{33}$ and the fourth group IV has a cemented lens made of a negative lens $L_{41}$ and a positive lens $L_{42}$ and a positive lens $L_{43}$. So arranged as above that the zoom lens of this embodiment can correct both the monochromatic and chromatic aberrations of respective groups by using only 12 lens elements and good aberration performances can be realized over the entire zoom range from wide end to telephoto end as well as over the entire photographing distance from the infinite to the closest point. In addition, all groups are respectively configured of three lenses, so that well-balanced aberration correction can be realized. Referring to the third group III, looking from the object side, a first lens $L_{31}$ is a positive lens whose image side surface $r_{12}$ is convex, a second lens $L_{32}$ is a positive lens whose object side surface $r_{13}$ is convex and a third lens $L_{33}$ is a negative lens whose object side surface $r_{15}$ is concave. As a result, despite that the aperture ratio is as large as about 1.4 in F-number, spherical aberration and on-axis chromatic aberration can be satisfactorily corrected. Also, by arranging both two positive lenses on the object side, the height of on-axis light ray can be prevented from increasing, thus making possible to decrease diameters of respective lenses forming the third group III.

Further referring to the third group III, it is preferable that the positive lens $L_{31}$ and/or the positive lens $L_{32}$ are made of a double-convex lens and that curvature radii of the object side and the image side thereof are equal in the absolute value to each other. This offers a great advantage in manufacturing the zoom lens in that there is no need to pay attention to the possibility that it might be oppositely inserted during assembling.

Furthermore, the fourth group IV is preferable to have a cemented lens whose cemented surface $r_{18}$ between the lenses $L_{41}$ and $L_{42}$ is convex to the object side direction and the positive lens $L_{43}$ whose object side surface $r_{20}$ is convex. So configured that coma aberration and lateral chromatic aberration can be satisfactorily corrected.

Further in addition, when configured so as to satisfy the following conditions, aberration performances are outstandingly effective and a compact zoom lens can be realized with a reduced number of lenses:

| | |
|---|---|
| $4.0 < f_1/f_w < 7.0$ | (1) |
| $0.8 < |f_2|/f_w < 1.6$ | (2) |
| $2.0 < f_3/f_w < 6.0$ | (3) |
| $2.0 < f_4/f_w < 3.0$ | (4) |
| $0.3 < d_{16}/f_4 < 1.0$ | (5) |
| $0.4 < |r_{12}|/f_3 < 4.0$ | (6) |
| $0.6 < r_{13}/f_3 < 3.0$ | (7) |
| $0.3 < |r_{15}|/f_3 < 2.0$ | (8) |
| $0.3 < r_{18}/f_4 < 1.0$ | (9) |
| $0.6 < r_{20}/f_4 < 1.8$ | (10) | where, $f_w$: entire focal length of wide angle end, $f_i$ ($i=1, 2, 3, 4$): focal length of i-th group lens system, $d_{16}$: 16th air space from the object side, $r_j$ ($j = 12, 13, 15, 18, 20$): curvature radius of the lens surface of j-th lens.

These conditions cover refractive powers, surface shapes or the like of lenses of respective groups, indicating ranges where compactization can be attained and satisfactory aberration performances can be realized with a reduced number of lens components.

Next, description will be made in detail on each condition.

Condition (1) relates to the refractive power of the first group I. When the lower limit is exceeded, the refractive power of the group I becomes too large, so that correction of spherical aberration of the telephoto side becomes difficult. When the upper limit is exceeded, the lens length becomes large, resulting in being impossible to realize the compactization of the zoom lens.

Condition (2) relates to the refractive power of the second group II. When being out of the lower limit, the compactization can be realized, but Petzval sum of the entire system becomes largely negative, so that correction of curvature of field cannot be realized only by selection of glass material to be used. When the upper limit is exceeded, the aberration correction can become easy, but the amount of movement for zooming becomes large, thus being unable to realize the compactization of the entire lens system.

Condition (3) relates to the refractive power of the third group III. When the lower limit is exceeded, the refractive power of this group III becomes too large, so that correction of spherical aberration of the wide angle side becomes difficult. When the upper limit is exceeded, the composite system of the groups I, II and III becomes a divergent system, so that the fourth group IV positioned successively adjacent thereto cannot have lenses reduced in diameter. Also, when being out of the upper and lower limit range, the change in the angle of view due to the move of the fourth group IV in the focusing process becomes large, so that image fluctuation cannot be made small.

Condition (4) relates to the refractive power of the group IV. When being out of the lower limit, the quantity of light at a corner of the image becomes small, so that the diameter of the lens system of the first group I is required to be increased in order to obtain a desired quantity of light, thus being unable to realize the compactization. When the upper limit is exceeded, correction of aberration becomes easy, but the moving amount of the fourth group IV becomes large when short-distance photographing is carried out, resulting in the fact that not only the compactization of the entire system cannot be realized, but also the correction of unbalanced off-axis aberration between the short-distance and long-distance photographings becomes difficult.

Condition (5) relates to the air space between the groups III and IV. When the lower limit is exceeded, the height of off-axis light ray becomes small, so that correction of lateral chromatic aberration becomes difficult to effect only by the selection of glass material to be used. In addition, a restriction is placed on the moving amount of the fourth group IV when carrying out a short-distance photographing, thus being impossible to realize a suitable closest range for photographing. When the upper limit is exceeded, the entire system becomes difficult to be compactized. Further in addition, in order that suitable quantity of light is to be ensured around the image plane, the lens system of the fourth group IV cannot be reduced in diameter.

Conditions (6), (7) and (8) relate to curvature radii of lenses forming the third group III. When lower limits of conditions (6) and (7) are exceeded, incident angles of off-axis light ray to the surfaces $r_{12}$ and $r_{13}$ become large, thus being difficult to correct the off-axis coma aberration. When upper limits of conditions (6) and (7) are exceeded, an under-corrected spherical aberration results. On the other hand, when the lower limit of condition (8) is exceeded, an over-corrected spherical aberration results. Also, when the upper limit of condition (8) is exceeded, coma aberration for the off-axis light ray on the side under than the principal ray becomes difficult to be corrected.

Conditions (9) and (10) relate to curvature radii of lenses forming the fourth group IV. When lower limits of conditions (9) and (10) are exceeded, incident angles of a light ray to these surfaces $r_{18}$ and $r_{20}$ become large, thus being difficult to correct coma aberration for the off-axis light ray on the side over than the principal ray. Also, when the lower limit of condition (9) is exceeded, spherical aberration of a short wavelength light ray, i.e., F-line or g-line, becomes difficult. When the upper limit of condition (9) is exceeded, on-axis and lateral chromatic aberrations cannot be corrected in the range where a glass material to be used is practically available. When the upper limit of condition (10) is exceeded, spherical aberration is difficult to be corrected.

Embodiments satisfiable these conditions shown above will be shown below, in which, $r_1, r_2, \ldots$ and $r_{23}$ respectively indicate curvature radii of surfaces of lenses in the successive order from the object side, $d_1$, $d_2, \ldots$ and $d_{22}$ respectively indicate thicknesses of lenses or air spaces between adjacent lenses to each other, $n_1$, $n_2$ lenses for d-line, and $\gamma_1, \gamma_2 \ldots$ and $\gamma_{12}$ respectively indicate Abbe numbers of lenses for the d-line. The alphabetical letter f indicates a focal length of the entire lens system and F/No indicates F-number.

FIRST EMBODIMENT

| \multicolumn{4}{c}{f = 8.880–53.933} |
| \multicolumn{4}{c}{F/No = 1.44–1.87} |

| | | | |
|---|---|---|---|
| $r_1 = 57.449$ | $d_1 = 1.2$ | $n_1 = 1.80518$ | $\nu_1 = 25.5$ |
| $r_2 = 28.664$ | $d_2 = 5.8$ | $n_2 = 1.58913$ | $\nu_2 = 61.2$ |
| $r_3 = -98.130$ | $d_3 = 0.2$ | | |
| $r_4 = 22.382$ | $d_4 = 2.9$ | $n_3 = 1.58913$ | $\nu_3 = 61.2$ |
| $r_5 = 37.942$ | $d_5$ (Variable) | | |
| $r_6 = 38.469$ | $d_6 = 0.9$ | $n_4 = 1.58913$ | $\nu_4 = 61.2$ |
| $r_7 = 8.973$ | $d_7 = 4.6$ | | |
| $r_8 = -12.718$ | $d_8 = 0.9$ | $n_5 = 1.67003$ | $\nu_5 = 47.2$ |
| $r_9 = 11.520$ | $d_9 = 2.9$ | $n_6 = 1.80518$ | $\nu_6 = 25.5$ |
| $r_{10} = 412.193$ | $d_{10}$ (Variable) | | |
| $r_{11} = 105.263$ | $d_{11} = 2.7$ | $n_7 = 1.73520$ | $\nu_7 = 41.0$ |
| $r_{12} = -28.990$ | $d_{12} = 0.2$ | | |
| $r_{13} = 32.792$ | $d_{13} = 2.5$ | $n_8 = 1.74400$ | $\nu_8 = 44.9$ |
| $r_{14} = -133.333$ | $d_{14} = 0.7$ | | |
| $r_{15} = -33.332$ | $d_{15} = 0.9$ | $n_9 = 1.80518$ | $\nu_9 = 25.5$ |
| $r_{16} = 133.333$ | $d_{16}$ (Variable) | | |
| $r_{17} = -1604.000$ | $d_{17} = 0.9$ | $n_{10} = 1.80518$ | $\nu_{10} = 25.5$ |
| $r_{18} = 15.139$ | $d_{18} = 4.3$ | $n_{11} = 1.69350$ | $\nu_{11} = 53.4$ |
| $r_{19} = -30.833$ | $d_{19} = 0.2$ | | |
| $r_{20} = 21.392$ | $d_{20} = 2.5$ | $n_{12} = 1.70154$ | $\nu_{12} = 41.1$ |
| $r_{21} = 641.519$ | $d_{21}$ (Variable) | | |
| $r_{22} = \infty$ | $d_{22} = 8.0$ | | |
| $r_{23} = \infty$ | | | |

Next, variable air spaces by zooming of this embodiment will be exemplified as follows.

When an object point distanced 2 m from the first surface $r_1$ of the lens $L_{11}$ in FIG. 1, the following data were obtained:

| | f | $d_5$ | $d_{10}$ | $d_{16}$ | $d_{21}$ |
|---|---|---|---|---|---|
| Wide angle | 8.884 | 0.800 | 23.970 | 16.140 | 2.041 |
| Standard | 29.635 | 16.250 | 8.520 | 12.818 | 5.362 |
| Telephoto | 53.933 | 21.216 | 3.554 | 14.772 | 3.409 |

Where, the standard position is a zoom position where the fourth group IV is most approached to the third group III.

| | |
|---|---|
| $f_1/f_w = 4.73$ | $|f_2|/f_w = 1.11$ |
| $f_3/f_w = 3.36$ | $f_4/f_w = 2.38$ |
| $d_{16}/f_4 = 0.56$–$0.77$ | $|r_{12}|/f_3 = 0.97$ |
| $r_{13}/f_3 = 1.10$ | $|r_{15}|/f_4 = 1.12$ |
| $r_{18}/f_4 = 0.72$ | $r_{20}/f_4 = 1.01$ |

SECOND EMBODIMENT

| \multicolumn{4}{c}{f = 9.200–52.413} |
| \multicolumn{4}{c}{F/No = 1.45–1.86} |

| | | | |
|---|---|---|---|
| $r_1 = 58.323$ | $d_1 = 1.2$ | $n_1 = 1.80518$ | $\nu_1 = 25.5$ |
| $r_2 = 29.049$ | $d_2 = 5.8$ | $n_2 = 1.58913$ | $\nu_2 = 61.2$ |
| $r_3 = -98.742$ | $d_3 = 0.2$ | | |
| $r_4 = 22.618$ | $d_4 = 2.9$ | $n_3 = 1.58913$ | $\nu_3 = 61.2$ |
| $r_5 = 38.228$ | $d_5$ (Variable) | | |
| $r_6 = 38.228$ | $d_6 = 0.9$ | $n_4 = 1.58913$ | $\nu_4 = 61.2$ |
| $r_7 = 9.204$ | $d_7 = 4.6$ | | |
| $r_8 = -13.029$ | $d_8 = 0.9$ | $n_5 = 1.67003$ | $\nu_5 = 47.2$ |
| $r_9 = 11.866$ | $d_9 = 3.0$ | $n_6 = 1.80518$ | $\nu_6 = 25.5$ |
| $r_{10} = 460.189$ | $d_{10}$ (Variable) | | |
| $r_{11} = 72.970$ | $d_{11} = 2.0$ | $n_7 = 1.74400$ | $\nu_7 = 44.9$ |
| $r_{12} = -72.970$ | $d_{12} = 0.2$ | | |
| $r_{13} = 40.893$ | $d_{13} = 2.8$ | $n_8 = 1.74400$ | $\nu_8 = 44.9$ |
| $r_{14} = -40.893$ | $d_{14} = 0.4$ | | |
| $r_{15} = -26.988$ | $d_{15} = 0.9$ | $n_9 = 1.80518$ | $\nu_9 = 25.5$ |
| $r_{16} = -99.444$ | $d_{16}$ (Variable) | | |

-continued

| f = 9.200-52.413 F/No = 1.45-1.86 | | |
|---|---|---|
| $r_{17} = 65.877$ | $d_{17} = 0.9$ | $n_{10} = 1.80518$ $\nu_{10} = 25.5$ |
| $r_{18} = 12.754$ | $d_{18} = 4.1$ | $n_{11} = 1.67790$ $\nu_{11} = 55.5$ |
| $r_{19} = -41.776$ | $d_{19} = 0.2$ | |
| $r_{20} = 23.911$ | $d_{20} = 1.9$ | $n_{12} = 1.70154$ $\nu_{12} = 41.1$ |
| $r_{21} = 145.361$ | $d_{21}$ (Variable) | |
| $r_{22} = \infty$ | $d_{22} = 8.0$ | |
| $r_{23} = \infty$ | | |

Next, variable air spaces by zooming of this embodiment will be exemplified as follows.

When an object point distanced 2 m from the first surface $R_1$ of the lens $L_{11}$ shown in FIG. 1, the following data were obtained:

| | f | $d_5$ | $d_{10}$ | $d_{16}$ | $d_{21}$ |
|---|---|---|---|---|---|
| Wide angle | 9.200 | 1.000 | 23.670 | 13.477 | 2.043 |
| Standard | 59.938 | 16.122 | 8.548 | 10.204 | 5.317 |
| Telephoto | 52.413 | 21.184 | 3.486 | 12.160 | 3.360 |

Where, the standard position is a zoom position where the fourth group IV is most approached to the third group III.

| | |
|---|---|
| $f_1/f_w = 4.62$ | $\|f_2\|/f_w = 1.11$ |
| $f_3/f_w = 3.08$ | $f_4/f_w = 2.54$ |
| $d_{16}/f_4 = 0.39-0.58$ | $\|r_{12}\|/f_3 = 2.58$ |
| $r_{13}/f_3 = 1.44$ | $\|r_{15}\|/f_4 = 0.95$ |
| $r_{18}/f_4 = 0.54$ | $r_{20}/f_4 = 1.02$ |

FIGS. 2A-2C and 3A-3C show aberration characteristics obtained in the first and second embodiments, respectively. In these figures, (A) denotes aberration characteristics in the wide angle end, (B) denotes aberration characteristics in an intermediate zoom position and (C) denotes aberration characteristics in the telephoto end. Also, in each of figures denoted at (A), (B) and (C), (a) indicates spherical aberration (mm), (b) indicates astigmatism (mm) and (c) indicates curvature of field (%). In the spherical aberration diagrams, continuous lines, dotted lines and short dashes lines show spherical aberration characteristics of d-line, F-line and C-line, respectively. In the astigmatism diagrams, dotted lines and continuous lines show meridional image surfaces and sagittal image surfaces, respectively.

From these diagrams, it is clear that the lens systems according to the first and second embodiments of this invention respectively exhibit good optical performances.

In addition, a zoom lens arrangement according to a third preferable embodiment of this invention is schematically cross-sectionally shown in FIG. 4. In FIG. 4, the zoom lens of this embodiment comprises, in the successive order from the object side, a first group I consisting of a negative lens $L_{11}$, a positive lens $L_{12}$ and a positive meniscus lens $L_{13}$, a second group II consisting of a negative meniscus lens $L_{21}$, a negative lens $L_{22}$ and a positive lens $L_{23}$, a third group III consisting of a positive lens $L_{31}$ at least one of whose surfaces is aspherical and a fourth group IV consisting of a cemented lens made of lenses $L_{41}$ and $L_{42}$ at least one of whose surfaces are aspherically shaped. So arranged that the zoom lens system of this embodiment makes possible that both the monochromatic and chromatic aberrations can be corrected by using only 9 lenses smaller in the number than in the above-mentioned embodiments and yet outstandingly preferable aberration characteristics can be realized over the entire zoom range from the wide angle end to the telephoto end as well as over the entire photographing distance from the infinite point to the closest point. In addition, the groups I and II are respectively made of three lenses, the group III intermediately placed as seen in FIG. 4 is made of a single aspherical lens and the group IV which is arranged at the closest position to the image side is made of two lenses having aspherical surfaces, thus making well-balanced correction of aberration possible.

Such a condition that the third group III is made of an aspherical lens having a positive refractive power and being convex to the object side is an indispensable factor in order to make the third group of a single lens as well as to correct various aberrations, particularly spherical aberration, under such a condition that the aperture ratio is as large as abut 1.4 in F-number.

In the fourth group IV, to make aspherical at least one of surfaces of the lenses $L_{41}$ and $L_{42}$ forming the cemented lens and yet to make the cemented surface $r_{14}$ convex to the object side are preferable. So configured that coma aberration and magnification chromatic aberration can be satisfactorily corrected by using only 2 lenses.

In addition, when configured so as to satisfy the following conditions, aberration performances are extremely superior and a compact zoom lens can be realized with a small number of lens components:

| | |
|---|---|
| $3.0 < f_1/f_w < 7.0$ | (11) |
| $0.5 < \|f_2\|/f_w < 1.6$ | (12) |
| $2.0 < f_3/f_w < 7.0$ | (13) |
| $2.0 < f_4/f_w < 4.0$ | (14) |
| $0.05 < d_{12}/f_4 < 1.0$ | (15) |
| $0.4 < r_{11}/f_3 < 1.5$ | (16) |
| $0.2 < r_{14}/f_4 < 1.5$ | (17) |

Where, $f_w$: entire focal length in the wide angle end, $f_i$ (i=1, 2, 3, 4): focal length of the i-th group, $d_{12}$: twelveth air space from the object side, $r_j$ (j=11, 14): curvature radius of the j-th lens surface.

These conditions cover refractive powers, surface shapes or the like of lenses of respective groups, indicating ranges where compactization can be attained and satisfactory aberration performances can be realized with a reduced number of lens components.

Next, description will be made in detail on these conditions.

Conditions (11), (12), (13), (14) and (15) cover the same contents as those covered by conditions (1), (2), (3), (4) and (5), respectively.

Condition (16) relates to the curvature radius of the surface $r_{11}$ on the object side of the aspherical lens $L_{31}$ of the third group III. Of the lens $L_{31}$, by making the surface $r_{11}$ on the object side and/or the surface $r_{12}$ on the image side aspherical and by optimizing the shape thereof, various aberrations can be satisfactorily corrected despite of using a single lens. However, when the lower limit of condition (16) is exceeded, correction of spherical aberration becomes difficult, and when the upper limit thereof is exceeded, correction of coma aberration for the off-axis light ray on the side under than the principal ray becomes difficult.

Condition (17) relates to the curvature radius of the cemented surface $r_{14}$ of the cemented lens of the fourth group IV. Of the negative refractive power lens $L_{41}$ and the positive refractive power lens $L_{42}$ forming the fourth group IV, by making aspherical at least one of the surface $r_{13}$ on the object side of the lens $L_{41}$, the cemented surface $r_{14}$ and the surface $r_{15}$ on the image side of the lens $L_{42}$ and by optimizing the shape thereof, monochromatic aberration can be satisfactorily corrected while correcting on-axis and lateral chromatic aberrations. However, when the lower limit of condition (17) is exceeded, incident angles of a light ray to these surfaces become large, so that correction of coma aberration for the off-axis light ray on the side over than the principal ray becomes difficult as well as an over-corrected spherical aberration results for the F-line. When the upper limit is exceeded, on-axis and lateral chromatic aberrations cannot be corrected in the range where a glass material to be used is practically available.

Embodiments satisfiable these conditions shown above will be shown below. Symbols used in these embodiments are identical to those used in Embodiments 1 and 2.

In addition, the aspherical surface shape is defined by the following expression:

$$Z = C \cdot Y^2/[1 + \sqrt{1 - (1 + K) \cdot C^2 \cdot Y^2}\,] + D \cdot Y^4 + E \cdot Y^6 + F \cdot Y^8 + G \cdot Y^{10}$$

where, Z: distance of a point on the aspherical surface from the contact plane at the vertex of aspherical surface when the height from the optical axis is expressed by Y Y: height from the optical axis
C: Curvature radius of the vertex of aspherical surface
($= 1 / r$)
K: Conical constant
D, E, F, G: Aspherical coefficient

THIRD EMBODIMENT $f = 5.964$–$35.709$
$F/No = 1.45$–$1.94$

| | | | |
|---|---|---|---|
| $r_1 = 40.151$ | $d_1 = 0.9$ | $n_1 = 1.80518$ | $\nu_1 = 25.5$ |
| $r_2 = 19.849$ | $d_2 = 4.8$ | $n_2 = 1.58913$ | $\nu_2 = 61.2$ |
| $r_3 = -76.574$ | $d_3 = 0.2$ | | |
| $r_4 = 14.954$ | $d_4 = 2.2$ | $n_3 = 1.58913$ | $\nu_3 = 61.2$ |
| $r_5 = 27.879$ | $d_5$ (Variable) | | |
| $r_6 = 17.496$ | $d_6 = 0.7$ | $n_4 = 1.58913$ | $\nu_4 = 61.2$ |
| $r_7 = 5.468$ | $d_7 = 3.2$ | | |
| $r_8 = -8.045$ | $d_8 = 0.7$ | $n_5 = 1.66672$ | $\nu_5 = 48.4$ |
| $r_9 = 6.929$ | $d_9 = 2.4$ | $n_6 = 1.80518$ | $\nu_6 = 25.5$ |
| $r_{10} = 97.444$ | $d_{10}$ (Variable) | | |
| $r_{11} = 12.857$ | $d_{11} = 2.9$ | $n_7 = 1.59561$ | $\nu_7 = 56.6$ |
| $r_{12} = -38.011$ | $d_{12}$ (Variable) | | |
| $r_{13} = 23.160$ | $d_{13} = 0.7$ | $n_8 = 1.84666$ | $\nu_8 = 23.9$ |
| $r_{14} = 7.750$ | $d_{14} = 3.7$ | $n_9 = 1.67790$ | $\nu_9 = 55.5$ |
| $r_{15} = -17.412$ | $d_{15}$ (Variable) | | |
| $r_{16} = \infty$ | $d_{16} = 8.0$ | | |
| $r_{17} = \infty$ | | | |

In addition, twelveth and fifteenth surfaces are aspherical whose aspherical coefficients are shown as follows:

| | 12th surface | 15th surface |
|---|---|---|
| K | $-2.809$E1 | $3.950$E-1 |
| D | $1.195$E-4 | $6.307$E-5 |
| E | $3.230$E-7 | $1.494$E-6 |
| F | $1.137$E-8 | $-8.021$E-8 |
| G | $-3.443$E-10 | $1.744$E-9 |

Next, variable air spaces by zooming of this embodiment will be exemplified as follows:

When an object point distanced 2 m from the first surface $r_1$ of the lens $L_{11}$ shown in FIG. 4, the following data were obtained:

| | f | $d_5$ | $d_{10}$ | $d_{12}$ | $d_{15}$ |
|---|---|---|---|---|---|
| Wide angle | 5.965 | 1.000 | 15.894 | 4.401 | 2.021 |
| Standard | 20.320 | 10.550 | 6.344 | 2.049 | 4.373 |
| Telephoto | 35.705 | 13.871 | 3.023 | 3.703 | 2.719 |

Where, the standard position is a zoom position where the fourth group IV is most approached to the third group III.

| | |
|---|---|
| $f_1/f_w = 4.68$ | $|f_2|/f_w = 1.05$ |
| $f_3/f_w = 2.76$ | $f_4/f_w = 3.21$ |
| $d_{12}/f_4 = 0.08$–$0.23$ | $r_{11}/f_3 = 0.78$ |
| $r_{14}/f_4 = 0.40$ | |

FOURTH EMBODIMENT $f = 5.968$–$36.103$
$F/No = 1.45$–$1.95$

| | | | |
|---|---|---|---|
| $r_1 = 42.958$ | $d_1 = 0.9$ | $n_1 = 1.80518$ | $\nu_1 = 25.5$ |
| $r_2 = 20.407$ | $d_2 = 4.8$ | $n_2 = 1.58913$ | $\nu_2 = 61.2$ |
| $r_3 = -62.676$ | $d_3 = 0.2$ | | |
| $r_4 = 15.802$ | $d_4 = 2.2$ | $n_3 = 1.58913$ | $\nu_3 = 61.2$ |
| $r_5 = 30.976$ | $d_5$ (Variable) | | |
| $r_6 = 28.571$ | $d_6 = 0.7$ | $n_4 = 1.58913$ | $\nu_4 = 61.2$ |
| $r_7 = 6.012$ | $d_7 = 2.9$ | | |
| $r_8 = -8.314$ | $d_8 = 0.7$ | $n_5 = 1.66672$ | $\nu_5 = 48.4$ |
| $r_9 = 7.421$ | $d_9 = 2.4$ | $n_6 = 1.80518$ | $\nu_6 = 25.5$ |
| $r_{10} = 118.398$ | $d_{10}$ (Variable) | | |
| $r_{11} = 15.271$ | $d_{11} = 2.6$ | $n_7 = 1.60311$ | $\nu_7 = 60.7$ |
| $r_{12} = -53.777$ | $d_{12}$ (Variable) | | |
| $r_{13} = 14.368$ | $d_{13} = 0.7$ | $n_8 = 1.80518$ | $\nu_8 = 25.5$ |
| $r_{14} = 6.282$ | $d_{14} = 4.9$ | $n_9 = 1.67790$ | $\nu_9 = 55.5$ |
| $r_{15} = -23.114$ | $d_{15}$ (Variable) | | |
| $r_{16} = \infty$ | $d_{16} = 8.0$ | | |
| $r_{17} = \infty$ | | | |

In addition, twelveth and fifteenth surfaces are aspherical whose aspherical coefficients are shown as follows:

| | 12th surface | 15th surface |
|---|---|---|
| K | $-2.073$E1 | 2.509 |
| D | $7.483$E-5 | $1.085$E-4 |
| E | $-1.188$E-7 | $5.003$E-7 |
| F | $2.112$E-8 | $-7.835$E-8 |
| G | $-3.638$E-10 | $1.158$E-9 |

Next, variable air spaces by zooming of this embodiment will be exemplified as follows:

When an object point distanced 2 m from the first surface $r_1$ of the lens $L_{11}$ shown in FIG. 4, the following data were obtained:

| | f | $d_5$ | $d_{10}$ | $d_{12}$ | $d_{15}$ |
|---|---|---|---|---|---|
| Wide angle | 5.968 | 1.000 | 15.894 | 8.161 | 2.019 |
| Standard | 20.101 | 10.580 | 6.314 | 5.942 | 4.238 |

-continued

| | f | $d_5$ | $d_{10}$ | $d_{12}$ | $d_{15}$ |
|---|---|---|---|---|---|
| Telephoto | 36.103 | 13.914 | 2.980 | 7.521 | 2.658 |

Where, the standard position is a zoom position where the fourth group IV is most approached to the third group III.

| | |
|---|---|
| $f_1/f_w = 4.61$ | $|f_2|/f_w = 1.05$ |
| $f_3/f_w = 3.35$ | $f_4/f_w = 2.71$ |
| $d_{12}/f_4 = 0.34$–$0.51$ | $r_{11}/f_3 = 0.76$ |
| $r_{14}/f_4 = 0.39$ | |

FIFTH EMBODIMENT $f = 5.961$–$35.802$
$F/No = 1.44$–$1.94$

| $r_{11} = 18.528$ | $d_{11} = 2.6$ | $n_7 = 1.59561$ | $v_7 = 56.6$ |
|---|---|---|---|
| $r_{12} = -25.947$ | $d_{12}$ (Variable) | | |
| $r_{13} = 16.225$ | $d_{13} = 0.7$ | $n_8 = 1.84666$ | $v_8 = 23.9$ |
| $r_{14} = 6.821$ | $d_{14} = 4.2$ | $n_9 = 1.67790$ | $v_9 = 55.5$ |
| $r_{15} = -20.544$ | $d_{15}$ (Variable) | | |
| $r_{16} = \infty$ | $d_{16} = 8.0$ | | |
| $r_{17} = \infty$ | | | |

The lenses of the first group I and second group II used in this Embodiment are identical to those used in Embodiment 1.

In addition, eleventh and fifteenth surfaces are aspherical whose aspherical coefficients are shown as follows:

| | 11th surface | 15th surface |
|---|---|---|
| K | $-1.293$ | $2.278$ |
| D | $-7.135$E-$5$ | $8.665$E-$5$ |
| E | $-9.310$E-$8$ | $-7.322$E-$7$ |
| F | $-1.395$E-$8$ | $-1.070$E-$8$ |
| G | $2.803$E-$10$ | $-9.903$E-$11$ |

Next, variable air spaces by zooming of this embodiment will be exemplified as follows:

When an object point distanced 2 m from the first surface $r_1$ of the lens $L_{11}$ in FIG. 4, the following data were obtained:

| | f | $d_5$ | $d_{10}$ | $d_{12}$ | $d_{15}$ |
|---|---|---|---|---|---|
| Wide angle | 5.961 | 1.000 | 15.894 | 6.526 | 2.019 |
| Standard | 20.152 | 10.550 | 6.344 | 4.324 | 4.222 |
| Telephoto | 35.796 | 13.871 | 3.023 | 5.874 | 2.671 |

Where, the standard position is a zoom position where the fourth group IV is most approached to the third group III.

| | |
|---|---|
| $f_3/f_w = 3.11$ | $f_4/f_w = 2.89$ |
| $d_{12}/f_4 = 0.22$–$0.38$ | $r_{11}/f_3 = 1.00$ |
| $r_{14}/f_4 = 0.40$ | |

SIXTH EMBODIMENT $f = 5.962$–$35.694$
$F/No = 1.43$–$1.94$

| $r_{11} = 13.238$ | $d_{11} = 2.9$ | $n_7 = 1.59561$ | $v_7 = 56.6$ |
|---|---|---|---|
| $r_{12} = -35.018$ | $d_{12}$ (Variable) | | |
| $r_{13} = 22.075$ | $d_{13} = 0.7$ | $n_8 = 1.84666$ | $v_8 = 23.9$ |
| $r_{14} = 7.500$ | $d_{14} = 3.7$ | $n_9 = 1.67790$ | $v_9 = 55.5$ |
| $r_{15} = -17.473$ | $d_{15}$ (Variable) | | |
| $r_{16} = \infty$ | $d_{16} = 8.0$ | | |
| $r_{17} = \infty$ | | | |

The lenses of the first group I and second group II used in this Embodiment are identical to those used in Embodiment 1.

In addition, eleventh and thirteenth surfaces are aspherical whose aspherical coefficients are shown as follows:

| | 11th surface | 13th surface |
|---|---|---|
| K | $-9.974$ | $-2.498$ |
| D | $1.217$E-$4$ | $-2.014$E-$5$ |
| E | $1.640$E-$7$ | $-4.821$E-$7$ |
| F | $2.638$E-$8$ | $3.190$E-$8$ |
| G | $-6.005$E-$10$ | $-6.865$E-$10$ |

Next, variable air spaces by zooming of this embodiment will be exemplified as follows:

When an object point distanced 2 m from the first surface $r_1$ of the lens $L_{11}$ in FIG. 4, the following data were obtained:

| | f | $d_5$ | $d_{10}$ | $d_{12}$ | $d_{15}$ |
|---|---|---|---|---|---|
| Wide angle | 5.962 | 1.000 | 15.894 | 5.046 | 2.021 |
| Standard | 20.202 | 10.550 | 6.344 | 2.710 | 4.357 |
| Telephoto | 35.690 | 13.871 | 3.023 | 4.349 | 2.717 |

Where, the standard position is a zoom position where the fourth group IV is most approached to the third group III.

| | |
|---|---|
| $f_3/f_w = 2.77$ | $f_4/f_w = 3.16$ |
| $d_{12}/f_4 = 0.12$–$0.27$ | $r_{11}/f_3 = 0.80$ |
| $r_{14}/f_4 = 0.40$ | |

FIGS. 5–5C, 6A–6C, 7A–7C and 8A–8C show aberration characteristics obtained in the third, fourth, fifth and sixth embodiments, respectively. In these figures, (A) denotes aberration characteristics in the wide angle end, (B) denotes aberration characteristics in an intermediate zoom position and (C) denotes aberration characteristics in the telephoto end. Also, in each of figures denoted at (A), (B) and (C), (a) denotes spherical aberration (mm), (b) astigmatism (mm) and (c) curvature of field (%). In the spherical aberration diagrams, continuous lines, dotted lines and short dashes lines show spherical aberration characteristics of d-line, F-line and C-line, respectively. In the astigmatism diagrams, dotted lines and continuous lines show meridional image surfaces and sagittal image surfaces, respectively.

From the diagrams, it is clear that these lens systems according to these embodiments respectively exhibit good optical performances.

What is claimed is:

1. A zoom lens comprising in successive order from the object side:
   a first group having a positive refractive power;
   a second group having a negative refractive power for effecting a variation of image magnification by moving on an optical axis of the zoom lens;
   a third group having a positive refractive power for effecting a light condensing action; and
   a fourth group moving on the optical axis so as to keep an image surface position to be changed in response to a movement of said second group and a movement of an object in a constant positional relation with a reference surface;
   wherein an air space between said third group and said fourth group has a maximum value of distance along the optical axis larger than the amount of movement of said fourth group, said first group being comprised of a negative lens, a positive lens and a positive meniscus lens, said second group being comprised of a negative meniscus lens, a negative lens and a positive lens, said third group composed of two positive lenses and a negative lens, and said fourth group being comprised of cemented lens and a positive lens, in the recited order from the object side, said zoom lens satisfying substantially the following conditions:

$$4.0 < f_1/f_w < 7.0$$
$$0.8 < |f_2|/f_w < 1.6$$
$$2.0 < f_3/f_w < 6.0$$
$$2.0 < f_4/f_w < 3.0$$
$$0.3 < d_{16}/f_4 < 1.0$$
$$0.4 < |r_{12}|/f_3 < 4.0$$
$$0.6 < r_{13}/f_3 < 3.0$$
$$0.3 < |r_{15}|/f_3 < 2.0$$
$$0.3 < r_{18}/f_4 < 1.0$$
$$0.6 < r_{20}/f_4 < 1.8$$

where, $F_w$: entire focal length in the wide angle end, fi (i = 1, 2, 3 and 4): focal length of i-th group, $d_{16}$: 16th air space from the object side, $r_j$ (j = 12, 13, 15, 18, 20): curvature radius of the lens surface of j-th lens.

2. A zoom lens according to claim 1, wherein said third group comprises, in the successive order from the object side, a first lens which is a positive lens whose image side surface is convex, a second lens which is a positive lens whose object side surface is convex and a third lens which is a negative lens whose object side surface is concave.

3. A zoom lens according to claim 2, wherein said first lens and said second lens respectively have positive refractive powers and further said first lens and the second lens being a double-convex lens whose object side surface and image side surface have curvature radii equal to each other and said third lens is a negative lens whose object side surface is concave.

4. A lens according to claim 2, wherein said first lens and said second lens respectively have positive refractive powers and further said first lens or said second lens being a double-convex lens whose object side surface and image side surface have curvature radii equal to each other and said third lens is a negative lens whose object side surface is concave.

5. A zoom lens according to claim 1, wherein said cemented lens of said fourth group has a cemented surface convex to the object side and said positive lens thereof has a surface convex to the object side.

6. A zoom lens comprising in successive order from the object side:
   a first group having a positive refractive power;
   a second group having a negative refractive power for effecting a variation of image magnification by moving on an optical axis of the zoom lens;
   a third group having a positive refractive power for effecting a light condensing action; and
   a fourth group moving on the optical axis so as to keep an image surface position to be changed in response to a movement of said second group and a movement of an object in a constant positional relation with a reference surface;
   wherein an air space between said third group and said fourth group has a maximum value of distance along the optical axis larger than the amount of movement of said fourth group, said first group being comprised of a negative lens, a positive lens and a positive meniscus lens, said second group being comprised of a negative meniscus lens, a negative lens and a positive lens, said third group being comprised of a positive lens at least one surface of which is aspherical, and said fourth group being comprised of a cemented lens having more than one surface which is aspherical, in the recited order from the object side, said zoom lens satisfying substantially the following condition:

$$3.0 < f_1/f_w < 7.0$$
$$0.5 < |f_2|/f_w < 1.6$$
$$2.0 < f_3/f_w < 7.0$$
$$2.0 < f_4/f_w < 4.0$$
$$0.05 < d_{12}/f_4 < 1.0$$
$$0.4 < r_{11}/f_3 < 1.5$$
$$0.2 < r_{14}/f_4 < 1.5$$

where, $F_w$: entire focal length in the wide angle end, $F_i$ (i = 1, 2, 3, 4): focal length of i-th group, $D_{12}$: 12th air space from the object side, $r_j$ (j = 11, 14): curvature radius of the lens surface of the j-th lens.

7. A zoom lens according to claim 6, wherein said third group comprises an aspherical lens having a positive refracting power and being convex to the object side.

8. A zoom lens according to claim 6, wherein said cemented lens of said fourth group has a cemented surface convex to the object side and having at least one surface aspherical.

* * * * *